US012801673B2

(12) United States Patent
Cohoon

(10) Patent No.: US 12,801,673 B2
(45) Date of Patent: Nov. 17, 2026

(54) CONTROLLING RESOURCE TRANSFERS BASED ON UNIQUE DIGITAL IDENTIFIER DATA

(71) Applicant: Truist Bank, Charlotte, NC (US)

(72) Inventor: Jason B. Cohoon, Sparta, TN (US)

(73) Assignee: TRUIST BANK, Charlotte, NC (US)

( * ) Notice: Subject to any disclaimer, the term of this patent is extended or adjusted under 35 U.S.C. 154(b) by 93 days.

(21) Appl. No.: 18/756,047

(22) Filed: Jun. 27, 2024

(65) Prior Publication Data

US 2026/0006032 A1 Jan. 1, 2026

(51) Int. Cl.

*H04L 9/40* (2022.01)
*G06F 16/93* (2019.01)
*G06F 21/60* (2013.01)

(52) U.S. Cl.

CPC ............ *G06F 16/93* (2019.01); *G06F 21/602* (2013.01); *G06F 21/604* (2013.01); *H04L 63/102* (2013.01)

(58) Field of Classification Search

CPC .. G06Q 20/042; G06Q 20/3223; G06Q 40/00; G06Q 20/002; G06Q 20/389; G06Q 40/02; G06Q 50/167; G06Q 20/023; G06Q 30/02; G06N 20/00; G06N 20/10; G06T 7/0002; H04L 9/0643

See application file for complete search history.

(56) References Cited

U.S. PATENT DOCUMENTS 7,620,604 B1 * 11/2009 Bueche, Jr. .......... G06Q 20/042 705/45
8,655,783 B1 * 2/2014 Williams ............... G06Q 40/02 705/64
8,688,579 B1 * 4/2014 Ethington ............ G06Q 20/042 705/42
11,030,752 B1 * 6/2021 Backlund .............. G06T 7/0002
11,521,184 B1 * 12/2022 Yaqub .................. G06Q 20/042
12,020,496 B2 * 6/2024 Roach .................. G06Q 20/023
2003/0061132 A1 * 3/2003 Yu, Sr. .................. G06Q 30/02 705/7.34
2006/0080245 A1 * 4/2006 Bahl ...................... G06Q 40/02 705/40
2006/0249567 A1 * 11/2006 Byrne .................... G06Q 40/00 235/375
2012/0101940 A1 * 4/2012 Brennan .............. G06Q 20/042 705/39
2013/0198071 A1 * 8/2013 Jurss ................. G06Q 20/3223 705/42
2020/0279231 A1 * 9/2020 Doyle .................... G06Q 40/00

(Continued)

*Primary Examiner* — Dustin Nguyen

(74) *Attorney, Agent, or Firm* — Nicholas Martin; Greenberg Traurig, LLP; Michael A. Springs

(57) ABSTRACT

A system can be provided for controlling resource transfers based on unique digital identifier data. For example, the system can generate a unique digital identifier and a status indicator for a document. A status corresponding to the status indicator can be selected from a pre-processing status, a processing status, and a post-processing status. The system can further store the unique digital identifier and the status indicator in a centralized database accessible by one or more entities. Additionally, the system can control a transfer of a resource with respect to a user account associated with one of the entities based on the unique digital identifier and the status indicator for the document. The transfer of the resource may be initiated using the document.

6 Claims, 3 Drawing Sheets

(56) References Cited

U.S. PATENT DOCUMENTS

| | | | | |
|---|---|---|---|---|
| 2022/0343015 | A1* | 10/2022 | Shahin | H04L 9/0643 |
| 2023/0214831 | A1* | 7/2023 | Lee | G06N 20/10 705/75 |
| 2023/0259924 | A1* | 8/2023 | Zamora | G06Q 20/389 705/64 |
| 2024/0013221 | A1* | 1/2024 | Kruse | G06N 20/00 |
| 2024/0087063 | A1* | 3/2024 | Wu | G06Q 50/167 |

* cited by examiner

CONTROLLING RESOURCE TRANSFERS BASED ON UNIQUE DIGITAL IDENTIFIER DATA

TECHNICAL FIELD

The present disclosure relates generally to data security and, more particularly (although not necessarily exclusively), to controlling resource transfers based on unique digital identifier data.

BACKGROUND

In some cases, a user can initiate a resource transfer via a digital or non-digital interaction channel. In some cases, the digital or non-digital interaction channel may be associated with one or more entity servers. Thus, the resource transfer can be processed by an entity server that can fulfill the resource transfer (e.g., by receiving a request for the resource transfer via the digital or non-digital interaction channel and executing the resource transfer based on the request). In some cases, processing requests received via the interaction channels individually can involve consuming a significant amount of computing resources and network bandwidth.

SUMMARY

According to one example of the present disclosure, a system can include a processor and a memory including instructions that are executable by the processor to perform operations. The operations can include generating a unique digital identifier and a status indicator for a document, wherein a status corresponding to the status indicator is selected from a group consisting of a pre-processing status, a processing status, and a post-processing status; storing the unique digital identifier and the status indicator in a centralized database accessible by a plurality of entities; and controlling, based on the unique digital identifier and the status indicator, a transfer of a resource with respect to a user account associated with an entity of the plurality of entities, wherein the transfer of the resource is initiated using the document.

According to another example of the present disclosure, a non-transitory computer readable medium may contain instructions that are executable by a processor to cause the processor to perform operations. The operations can include generating a unique digital identifier and a status indicator for a document, wherein a status corresponding to the status indicator is selected from a group consisting of a pre-processing status, a processing status, and a post-processing status; storing the unique digital identifier and the status indicator in a centralized database accessible by a plurality of entities; and controlling, based on the unique digital identifier and the status indicator, a transfer of a resource with respect to a user account associated with an entity of the plurality of entities, wherein the transfer of the resource is initiated using the document.

According to a further example of the present disclosure, a computer-implemented method can involve generating a unique digital identifier and a status indicator for a document, wherein a status corresponding to the status indicator is selected from a group consisting of a pre-processing status, a processing status, and a post-processing status; storing the unique digital identifier and the status indicator in a centralized database accessible by a plurality of entities; and controlling, based on the unique digital identifier and the status indicator, a transfer of a resource with respect to a user account associated with an entity of the plurality of entities, wherein the transfer of the resource is initiated using the document.

DETAILED DESCRIPTION

Figure 1:
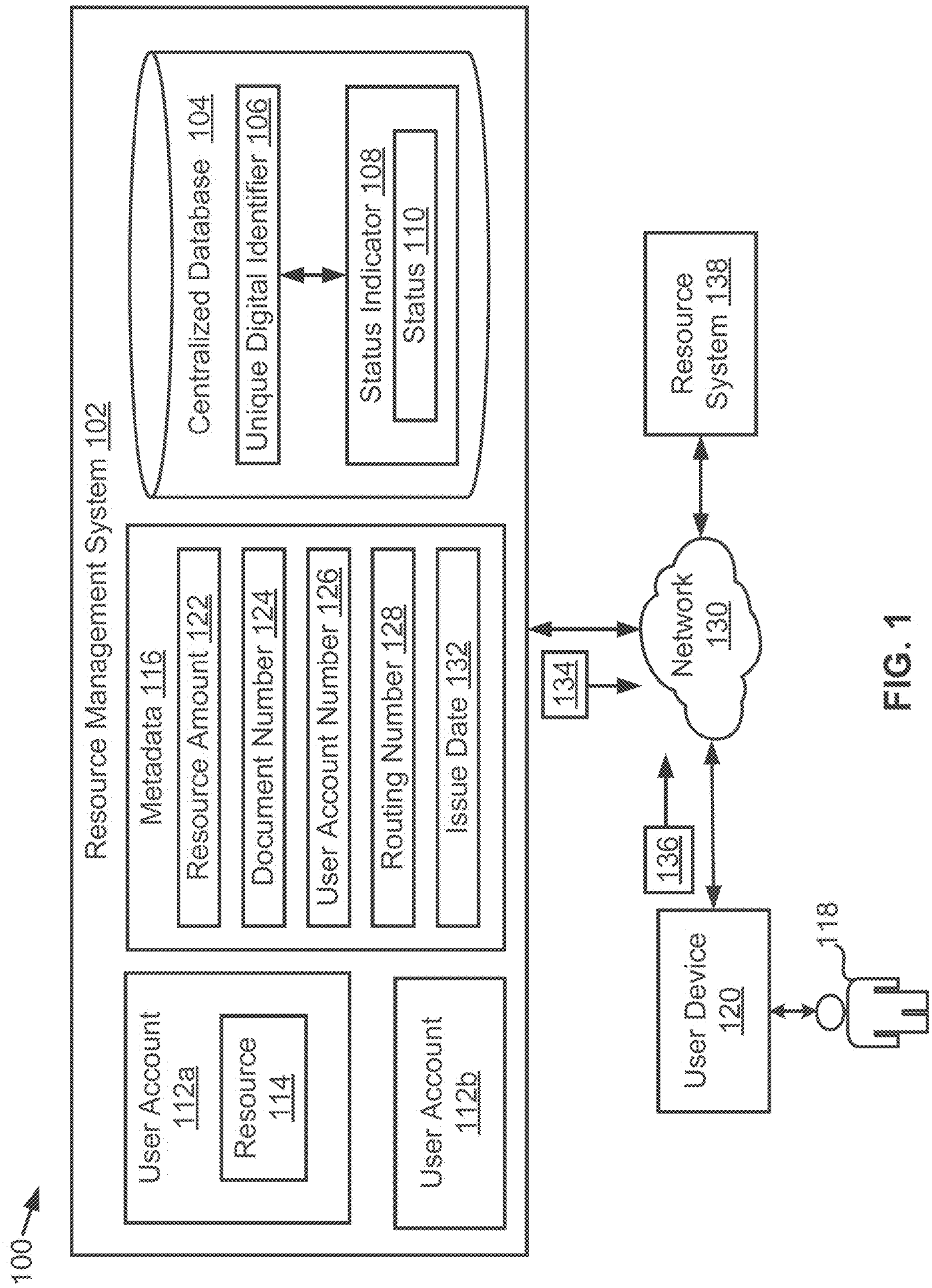
FIG. 1 is a block diagram of an example of a computing environment for controlling resource transfers based on unique digital identifier data according to some embodiments of the present disclosure.

Certain aspects and examples of the present disclosure relate to controlling resource transfers based on unique digital identifier data. In some aspects, the resource transfers can be initiated using a document, such as a check. To control the resource transfer, the unique digital identifier data can be generated for the document and stored in a centralized database. The unique digital identifier data can include at least a unique digital identifier and a status indicator.

The unique digital identifier can include a document number, a user account number, a routing number, or the combination thereof for the document. For example, the unique digital identifier can be an object with attributes corresponding to the document number, the user account number, and the routing number. In some examples, the unique digital identifier can be converted to a secure format to prevent tampering or unauthorized access. For example, the object and attributes can be encrypted.

Additionally, the status indicator can be a value (e.g., 1, 2, 3, etc.) or string indicative of a status of the document. The status inicated by the status indicator can be a pre-processing status, a processing status, or a post-processing status. The pre-processing status can indicate that the document has not been used in depositing or transferring a resource. The processing status can indicate that a transfer or deposit of a resource associated with the document is in process. The post-processing status can indicate that a transfer or deposit of a resource associated with the document has been initiated and performed, canceled, or otherwise carried out in a successful or unsuccessful manner.

In some examples, a resource transfer may be initiated as a result of a user attempt to deposit an amount of a resource into a user account using the document. The user account can be managed by an entity. Thus, before the resource can be deposited, a system associated with the entity can verify the use of the document. For example, the system can search for the unique digital identifier and the status indicator corresponding to the document in the centralized database. Then, based on the status indicator, the system can determine the status of the document. If the status of the document is the pre-processing status, the system can authorize the deposit of the resource into the user account. If the status of the document is the processing or post-processing status, the system can prevent the deposit of the resource into the account.

Thus, aspects of the present disclosure can facilitate secure access to data associated with documents. For example, by encrypting the unique digital identifier data, data integrity and reliability can be ensured as the data is stored, accessed, updated, or the like while in the centralized database. Additionally, the encryption can enable various entities to securely access the data in an efficient manner with minimal risk of data leakage. Moreover, by facilitating the secure access to the unique digital identifier data and by the unique digital identifier data including a status of the document, the system can facilitate secure resource transfers. For example, if the user attempt to deposit the resource is fraudulent (e.g., a second attempt to use the document to deposit the resource), the status of the document can indicate that the document has been used in a current or previous deposit of the resource. As a result, the deposit can be denied, thereby preventing the fraudulent use of the document.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for controlling resource transfers based on unique digital identifier data according to some embodiments of the present disclosure. The computing environment 100 can include a resource management system 102, which can be in communication with one or more user devices 120 via a network 130. Examples of the network 130 can include a local area network (LAN) or the Internet. Examples of the user device 120 can include mobile phones, laptops, tablets, smart watches, etc. The user device 120 can be associated with an entity (e.g., a financial institution). The computing environment 100 can further include a resource system 138 and a centralized database 104, which may each be part of the resource management system 102 or may be communicatively coupled with the resource management system 102 via the network 130.

In some examples, the computing environment 100 may be a distributed computing environment, such as a cloud computing system, an loT computing platform, or a computing cluster, formed from one or more nodes (e.g., physical or virtual servers) that are in communication with one another via the network 130. Additionally, in some examples, the computing environment 100 can be formed from a physical infrastructure that includes various network hardware, such as routers, hubs, bridges, switches, and firewalls. The physical infrastructure can also include one or more servers. The servers may provide backend support for a software application (e.g., a mobile application) or a web interface for enabling a user 118 to transmit requests to the resource management system 102, such as a request for a transfer of a resource.

In some examples, documents (e.g., a check) can be used to define or initiate a transfer of a resource. For example, a document may include a document number 124, a resource amount 122, a user account number 126, a routing number 128, an issue date 132, or a combination thereof. The document number 124 can be a number unique to the document, which can be used to identify the document. The resource amount 122 can specify an amount of a resource 114 (e.g., funds) that may be transferred using the document. The user account number 126 can be a number unique to a first user account 112*a* from which the resource 114 may be transferred. The routing number 128 can be a number unique to the entity that manages the first user account 112*a*. For example, the entity may be a financial institution and the first user account 112*a* may be a checking account. The issue date 132 can indicate a day, month, year, time, or a combination thereof after which the document can be used to initiate the transfer of the resource 114.

To facilitate secure use of the document in transferring the resource 114, the resource management system 102 may generate a unique digital identifier 106 and a status indicator 108 for the document. The resource management system 102 may generate the unique digital identifier 106 and status indicator 108 in response to the entity creating (e.g., generating and printing) the document. In some examples, the resource management system 102 can generate the unique digital identifier 106 with metadata 116 for the document such as the document number 124, the user account number 126, the routing number 128, or a combination thereof. For example, the unique digital identifier 106 can be an object with attributes corresponding to the the document number 124, the user account number 126, the routing number 128, or a combination thereof.

In some examples, the unique digital identifier 106 can be converted to a secure format to prevent tampering or unauthorized access. In such examples, generating the unique digital identifier 106 can further include encrypting the object or otherwise encrypting the metadata 116 which identifies the document (e.g., the document number 124, the user account number 126, and the routing number 128). Alternatively, in such examples, the unique digital identifier 106 can be a cryptographic hash. To generate the cryptographic hash, the resource management system 102 can input the metadata 116 into a hash function configured to output a unique, fixed value (e.g., the cryptographic hash).

The resource management system 102 can further generate a status indicator 108 for the document. For example, in response to the document being created by the entity, the status indicator 108 can be generated. The status indicator 108 can be a value (e.g., 1, 2, 3, etc.) or string indicative of a status 110 of the document. The status 110 inicated by the status indicator 108 can be a pre-processing status, a processing status, or a post-processing status. The pre-processing status can indicate that the document has not be used in initiating a transfer of a resource. The processing status can indicate that a transfer of a resource associated with the document is in process. The post-processing status can indicate that a transfer of a resource associated with the document has been initiated and performed, canceled, or otherwise carried out in a successful or unsuccessful manner. Thus, in response to the entity creating (e.g., generating and printing) the document, an initial status indicator 108 generated and associated with the unique digital identifier 106 can indicate that the status 110 of the document is the pre-processing status.

In another example, the resource management system 102 may receive one or more images of the document, such as an image of a front side and an image of a back side of the document. The resource management system 102 can use optical character recognition to convert each image into searchable data and can derive the metadata 116 from the searchable data. The resource management system 102 can then generate the unique digital identifier 106 and the status indicator 108 based on the searchable data. For example, based on the searchable data, the resource management system 102 may detect a signature, hole, ink stamp, or other suitable markings on the document, which may indicate that document has been used to transfer a resource. Thus, a status 110 indicated by the status indicator can be the post-process status. Alternatively, if there is not a marking indicating the resource transfer has been performed or canceled, the status 110 corresponding to the status indicator 108 can be the pre-processing status.

Additionally, the resource management system 102 may store the unique digital identifier 106, the metadata 116, the status indicator 108, or a combination thereof for the document in a centralized database 104. The centralized database 104 can be accessible by any number of entities. For example, the centralized database 104 can be accessible through the network 130. Users associated with the entities (e.g., employees) may access the centralized database via user devices registered with the entities or a software application. Access for the user to the unique digital identifier 106 can be controlled using an authentication process in which the users may provide authorization credentials (e.g., a username and password) to receive access to the centralized database 104. Additionally or alternatively, access for the users can be controlled by encrypting the data stored within the centralized database, implementing secure network architecture (e.g., firewalls, virtual private networks, or the like), or using other data security techniques.

The resource management system 102 can further control the transfer of the resource 114 based on the unique digital identifier 106, the metadata 116, the status indicator 108, or the combination thereof. For example, the resource management system 102 may detect a resource request 136 transmitted by the user device 120 associated with the entity. For example, the user device 120 can be registered with the first user account 112*a* managed by the entity or the user device 120 can be an employee device being used within a secure location associated with the entity. The resource request 136 can be a request to transfer a resource from the first user account 112*a* to a second user account 112*b* based on the document. The resource request 136 can include at least some of the metadata 116, such as the resource amount 122, the document number 124, the user account number 126, the routing number 128, the issue date 132, or a combination thereof.

In one example, the user 118 may use a software application executing on the user device 120 to scan or take an image of the document and transmit the resource request 136 to the resource management system 102. In such an example, the resource request 136 may include the metadata 116, which can be derived from the scan or image of the document. In another example in which the user device 120 is the employee device, an authorized user associated with the entity (e.g., an employee of the entity) receive the document or an image of the document. The authorized user may then input the metadata 116 into the user device 120 and transmit the resource request via the user device 120.

Upon receiving the resource request 136, the resource management system 102 can determine the status of the document. To determine the status, the resource management system 102 can use the metadata 116 in the resource request to find the unique digital identifier 106 and corresponding status indicator 108 stored in the centralized database 104. If the unique digital identifier 106, the status indicator 108, or the combination thereof are encrypted, the resource management system 102 may further execute a decryption process. For example, the resource management system 102 may retrieve a decryption key to decrypt the encrypted data of the centralized database 104 associated with the document. In other examples in which the unique digital identifier in a cryptographic hash, the resource management system 102 can recalculate the cryptographic hash using the metadata 116 in the resource request 136. The resource management system can then query for the cryptographic hash stored in the centralized database 104.

In one example, upon finding the unique digital identifier 106 and status indicator 108, the resource management system 102 can determine that the status 110 of the document is the pre-processing status. As a result, the resource management system 102 can authorize the transfer of the resource from the first user account 112*a* to the second user account 112*b*. To do so, the resource management system 102 may forward the resource request 136 to a resource system 138 (e.g., automated clearing house) which can perform the transfer of the resource 114.

Additionally or alternatively, the resource management system 102 may have access to the first user account 112*a*, the second user account 112*b*, or a combination thereof. Thus, the resource management system 102 may retrieve the resource 114 from the first user account 112*a* and transmit the resource 114 to the resource system 138. In such an example, the resource system 138 may then deposit the resource 114 into the second user account 112*b*. In another example, after retrieving the resource, the resource management system 102 may deposit the resource directly into the second user account 112*b*.

Upon authorizing the transfer of the resource 114, the resource management system 102 can also transmit an alert 134 to the user device 120. The alert 134 can indicate the authorization the transfer of the resource 114. Additionally, upon authorizing the transfer of the resource 114, the resource management system 102 can update the status 110 of the document in the centralized database 104. For example, the resource management system 102 can modify the status indicator 108 to indicate that the transfer is in process, and therefore the status 110 of the document is the processing status. The resource management system 102 may further detect that the resource 114 has been received by the first user account 112*a*. As a result, the resource management system 102 may modify the status indicator 108 again to indicate that status 110 of the document is the post-processing status.

In another example, in response to receiving the resource request 136 and finding the unique digital identifier 106 and status indicator 108 in the centralized database 104, the resource management system 102 can determine that the status 110 of the document is the post-processing status. The post-processing status can indicate that the transfer of the resource 114, as defined by the document, has been performed. Thus, the resource management system 102 may deny the resource request 136 to prevent the transfer of the resource 114 from first user account 112*a* to another user account. In this way, the resource management system 102 can prevent the document from being used in a fraudulent manner. For example, if the document is a check, the resource management system 102 can prevent the check from being used to transfer the resource 114 from the first user account 112*a* more than once. The resource management system 102 can also generate and transmit another alert to the user device 120, which can include an indication of the denial of the resource request 136.

Additionally, in some examples, a user interface can be used to transmit the resource request 136 (e.g., a user interface associated with the software application executing on the user device 120 used to to scan or take an image of the document and transmit the resource request 136). Thus, in some examples, upon determining that the status 110 is the post-processing status, the resource management system 102 can automatically prevent access for the user device 120 to the user interface. For example, the user device 120 can be locked out of the software application to prevent the user 118 of the user device 120 from initiating additonal resource requests.

Figure 2:
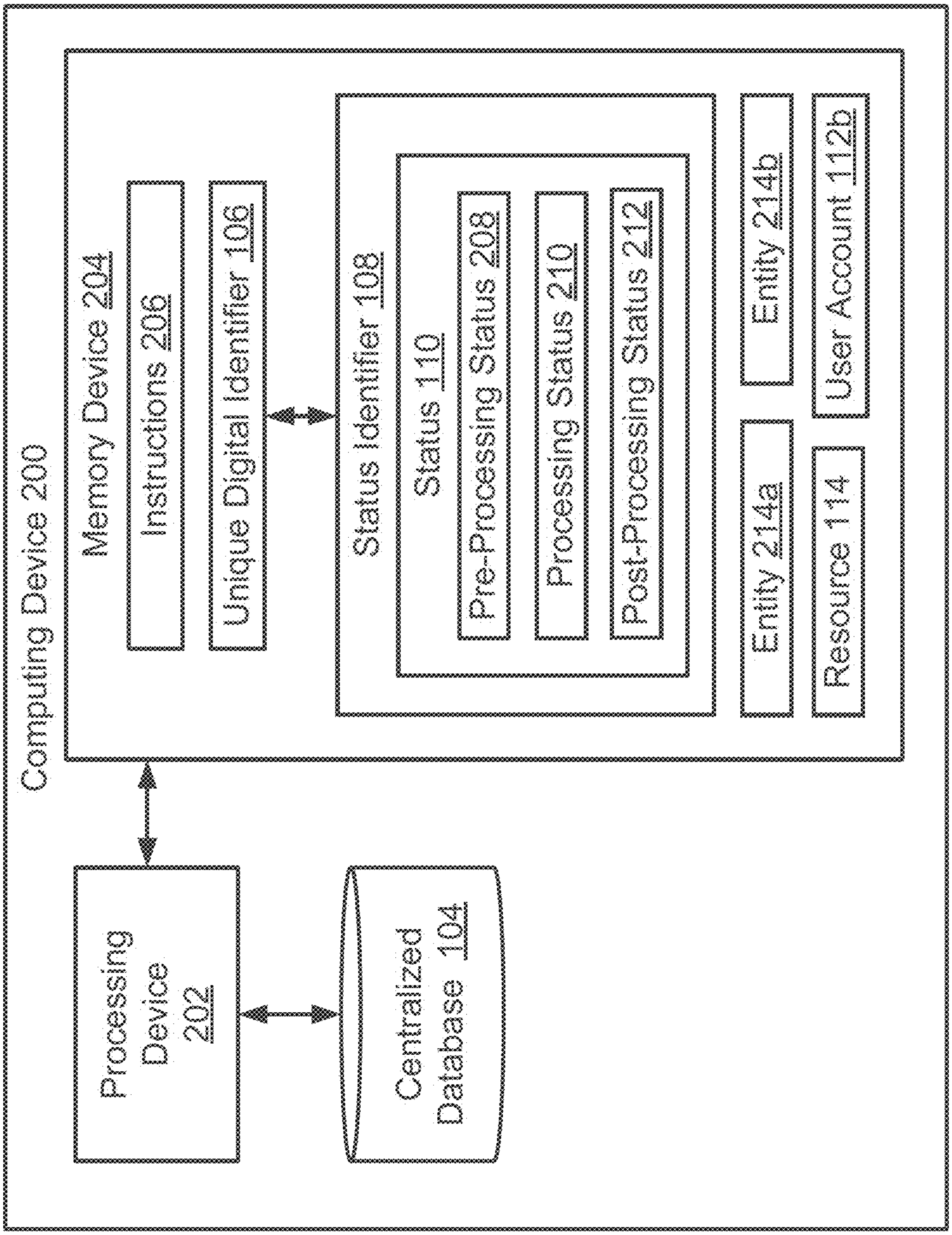
FIG. 2 is a block diagram of an example of a computing device for controlling resource transfers based on unique digital identifier data according to some embodiments of the present disclosure.

FIG. 2 is a block diagram of an example of a computing device for controlling resource transfers based on unique digital identifier data according to some embodiments of the present disclosure. As depicted, the computing device 200 may include a processing device 202 communicatively coupled to a memory device 204. In some examples, the components shown in FIG. 2 can be integrated into a single structure. For example, the components can be within a single housing. In other examples, the components shown in FIG. 2 can be distributed (e.g., in separate housings) and in electrical communication with each other.

The processing device 202 can execute one or more operations for implementing some examples. The processing device 202 can execute instructions 206 stored in the memory device 204 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessor, etc. In some examples, the instructions 206 can include processor-specific instructions generated by a compiler or an interpreter from code written in any suitable computer-programming language, such as C, C++, C #, Python, or Java.

The memory device 204 can include one memory or multiple memories. The memory device 204 can be non-volatile and may include any type of memory that retains stored information when powered off. Non-limiting examples of the memory device 204 include electrically erasable and programmable read-only memory (EEPROM), flash memory, or any other type of non-volatile memory. At least some of the memory device 204 can be a non-transitory, computer-readable medium from which the processing device 202 can read the instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which the processing device 202 can read the instructions 206.

The processing device 202 can execute the instructions 206 to perform operations. For example, the processing device 202 can generate a unique digital identifier 106 and a status indicator 108 for a document. A status 110 corresponding to the status indicator 108 can be selected from a group consisting of a pre-processing status 208, a processing status 210, and a post-processing status 212. The processing device 202 can further store the unique digital identifier 106 and the status indicator 108 in a centralized database 104 accessible by a plurality of entities 214*a-b*. Additionally, the processing device 202 can control, based on the unique digital identifier 106 and the status indicator 108, a transfer of a resource 114 with respect to a user account 112*b* associated one of the entities 214*a-b*. The transfer of the resource 114 may be initiated using the document.

Figure 3:
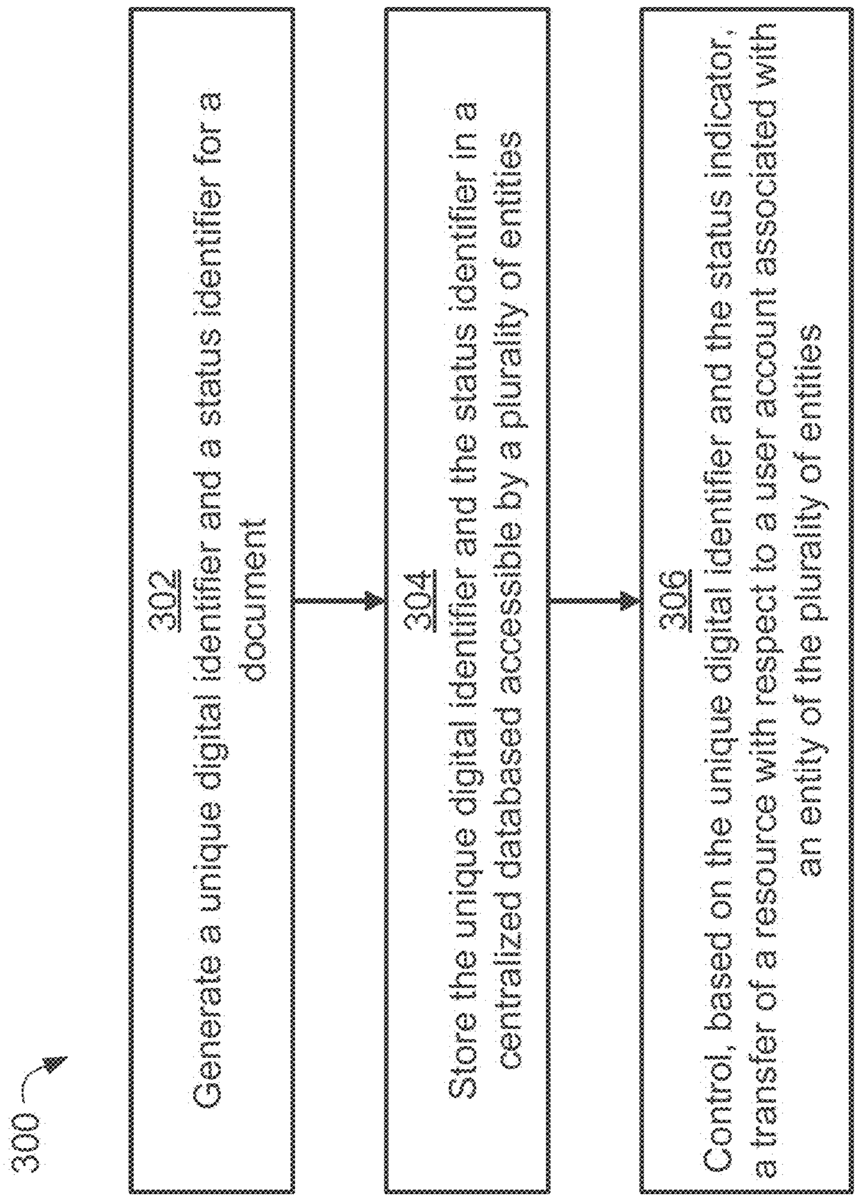
FIG. 3 is a flowchart of an example of a process for controlling resource transfers based on unique digital identifier data according to some embodiments of the present disclosure.

FIG. 3 is a flowchart of an example of a process 300 for controlling resource transfers based on unique digital identifier data according to some embodiments of the present disclosure. The process 300 can be implemented by the resource management system 102 of FIG. 1 or the processing device 202 of FIG. 2, but other implementations are also possible. While FIG. 3 depicts a certain sequence of steps for illustrative purposes, other examples can involve more steps, fewer steps, different steps, or a different order of the steps depicted in FIG. 3. The steps of FIG. 3 are described below with reference to the components of FIGS. 1-2 described above.

At block 302, the processing device 202 can generate a unique digital identifier 106 and a status indicator 108 for a document. A status 110 corresponding to the status indicator 108 can be a pre-processing status 208, a processing status 210, or a post-processing status 212. In an example, the document may be a check, and an entity (e.g., entity 214*a*) may create (e.g., generate or print) the document. The entity may further issue the document to a user for use in initiating a transfer of a resource 114 (e.g., funds) from a first user account 112*a*.

In accordance with the entity creating the document, the processing device 202 may receive metadata corresponding to the document, such as a document number 124, a user account number 126, and a routing number 128. For example, a user (e.g., an employee) associated with the entity may transmit the metadata 116 to the processing device 202 via a user device. Additionally or alternatively, the metadata 116 may be automatically transmitted to the processing device 202 when the document is generated digitally prior to printing. The processing device 202 can input then metadata 116 into a hash function configured to output a unique, fixed value (e.g., the unique digital identifier 106).

Additionally, based on receiving the metadata 116 and based on the document being created by the entity, the status indicator 108 can be generated to indicate that a status of the document is the pre-processing status. That is, the status indicator 108 can be generated to indicate that the document has yet to be to used to initiate a transfer of the resource 114 from the first user account 112*a*.

At block 304, the processing device 202 can store the unique digital identifier 106 and the status indicator 108 in a centralized database 104 accessible by a plurality of entities 214*a-b*. The centralized database 104 can be accessible by user devices associated with the entities through a network 130. For example, users may use the user devices to provide authorization credentials (e.g., a username and password) and may receive access to the centralized database 104 upon the processing device 202 verifying the authorization credentials. Thus, data, such as the unique digital identifier 106 and the status indicator 108, can be securely stored in the centralized database 104.

At block 306, the processing device 202 can control, based on the unique digital identifier 106 and the status indicator 108, a transfer of a resource 114 with respect to a user account 112*b* associated with an entity 214*a* of the plurality of entities 214*a-b*. For example, the processing device 202 may detect a resource request 136 transmitted by a user device 120 associated with the first user account 112*a* and the entity. The resource request 136 can be a request to transfer the resource 114 from the first user account 112*a* to a second user account 112*b* based on a resource amount 122 indicated by the document. The resource request 136 may be transmitted as a result of the user 118 submitting images of the document via the user device 120. Upon detecting the resource request 136, the processing device 202 can search for the unique digital identifier 106 and the status indicator 108 in the centralized database 104. Based on the status indicator 108, the processing device 202 can determine that the status 110 of the document is the pre-processing status. As a result, the processing device 202 can authorize the transfer of the resource 114 from the first user account 112*a* to the second user account 112*b*. To do so, the processing device 202 may forward the resource request 136 to a resource system 138 (e.g., automated clearing house) which can perform the transfer of the resource 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a memory device that includes instructions executable by the processing device for causing the processing device to perform operations comprising:

generating, in response to an entity creating a document, a status indicator for the document, wherein a status corresponding to the status indicator is a pre-processing status indicating that the document has not been used in initiating a transfer of a resource;

receiving, in response to the entity creating the document, metadata corresponding to the document, the metadata comprising a document number, a user account number, and a routing number;

generating a cryptographic hash for the document by inputting the metadata corresponding to the document into a hash function;

storing the cryptographic hash and the status indicator in a centralized database accessible by a plurality of entities including the entity;

detecting a resource request transmitted by a user device to the entity using the document, wherein the resource request is a request to transfer the resource from a first user account to a second user account, and wherein the resource request comprises the metadata corresponding to the document;

in response to detecting the resource request, calculating the cryptographic hash using the metadata in the resource request and the hash function;

querying the centralized database using the cryptographic hash to determine the status corresponding to the status indicator for the document;

in response to determining that the status corresponding to the status indicator for the document is the pre-processing status:

transmitting the resource request to a resource system to cause the resource system to perform the transfer of the resource from the first user account to the second user account;

detecting that the second user account has received the resource;

in response to detecting that the second user account has received the resource, updating the status indicator corresponding to the document to generate an updated status indicator, wherein a status corresponding to the updated status indicator is a post-processing status indicating that the second user account received the resource; and storing the updated status indicator in the centralized database in association with the cryptographic hash;

detecting a second resource request from a second user device, the second resource request being a request to transfer the resource based on the document;

in response to detecting the second resource request, accessing the centralized database to determine, based on the cryptographic hash and the updated status indicator, that the status of the document is the post-processing status;

based on determining that the status of the document is the post-processing status, denying the second resource request, wherein a user of the second user device initiates the second resource request via a user interface;

generating an alert comprising an indication of the denial of the second resource request and transmitting the alert to the second user device; and automatically preventing access by the second user device to the user interface.

2. The system of claim 1, wherein the operations further comprise, subsequent to transmitting the resource request to the resource system to cause the resource system to perform the transfer of the resource from the first user account to the second user account:

detecting that the resource system has initiated the transfer of the resource from the first user account to the second user account; and in response to detecting that the resource system has initiated the transfer of the resource from the first user account to the second user account, updating the status indicator to change the status of the document from the pre-processing status to the processing status to generate a second updated status indicator; and storing the second updated status indicator in the centralized database in association with the hash function.

3. A computer-implemented method comprising:

generating, in response to an entity creating a document, a status indicator for the document, wherein a status corresponding to the status indicator is a pre-processing status indicating that the document has not been used in initiating a transfer of a resource;

receiving, in response to the entity creating the document, metadata corresponding to the document, the metadata comprising a document number, a user account number, and a routing number;

generating a cryptographic hash for the document by inputting the metadata corresponding to the document into a hash function;

storing the cryptographic hash and the status indicator in a centralized database accessible by a plurality of entities including the entity;

detecting a resource request transmitted by a user device to the entity using the document, wherein the resource request is a request to transfer the resource from a first user account to a second user account, and wherein the resource request comprises the metadata corresponding to the document;

in response to detecting the resource request, calculating the cryptographic hash using the metadata in the resource request and the hash function;

querying the centralized database using the cryptographic hash to determine the status corresponding to the status indicator for the document;

in response to determining that the status corresponding to the status indicator for the document is the pre-processing status:

transmitting the resource request to a resource system to cause the resource system to perform the transfer of the resource from the first user account to the second user account;

detecting that the second user account has received the resource;

in response to detecting that the second user account has received the resource, updating the status indicator corresponding to the document to generate an updated status indicator, wherein a status corresponding to the updated status indicator is a post-processing status indicating that the second user account received the resource; and storing the updated status indicator in the centralized database in association with the cryptographic hash;

detecting a second resource request from a second user device, the second resource request being a request to transfer the resource based on the document;

in response to detecting the second resource request, accessing the centralized database to determine, based on the cryptographic hash and the updated status indicator, that the status of the document is the post-processing status;

based on determining that the status of the document is the post-processing status, denying the second resource request, wherein a user of the second user device initiates the second resource request via a user interface;

generating an alert comprising an indication of the denial of the second resource request and transmitting the alert to the second user device; and automatically preventing access for the second user device to the user interface.

4. The computer-implemented method of claim 3, further comprising, subsequent to transmitting the resource request to the resource system to cause the resource system to perform the transfer of the resource from the first user account to the second user account:

detecting that the resource system has initiated the transfer of the resource from the first user account to the second user account; and in response to detecting that the resource system has initiated the transfer of the resource from the first user account to the second user account, updating the status indicator to change the status of the document from the pre-processing status to the processing status to generate a second updated status indicator; and storing the second updated status indicator in the centralized database in association with the hash function.

5. A non-transitory computer-readable medium comprising instructions that are executable by a processing device for causing the processing device to perform operations comprising:

generating, in response to an entity creating a document, a status indicator for the document, wherein a status corresponding to the status indicator is a pre-processing status indicating that the document has not been used in initiating a transfer of a resource;

receiving, in response to the entity creating the document, metadata corresponding to the document, the metadata comprising a document number, a user account number, and a routing number;

generating a cryptographic hash for the document by inputting the metadata corresponding to the document into a hash function;

storing the cryptographic hash and the status indicator in a centralized database accessible by a plurality of entities including the entity;

detecting a resource request transmitted by a user device to the entity using the document, wherein the resource request is a request to transfer the resource from a first user account to a second user account, and wherein the resource request comprises the metadata corresponding to the document;

in response to detecting the resource request, calculating the cryptographic hash using the metadata in the resource request and the hash function;

querying the centralized database using the cryptographic hash to determine the status corresponding to the status indicator for the document;

in response to determining that the status corresponding to the status indicator for the document is the pre-processing status:

transmitting the resource request to a resource system to cause the resource system to perform the transfer of the resource from the first user account to the second user account;

detecting that the second user account has received the resource;

in response to detecting that the second user account has received the resource, updating the status indicator corresponding to the document to generate an updated status indicator, wherein a status corresponding to the updated status indicator is a post-processing status indicating that the second user account received the resource; and storing the updated status indicator in the centralized database in association with the cryptographic hash;

detecting a second resource request from a second user device, the second resource request being a request to transfer the resource based on the document;

in response to detecting the second resource request, accessing the centralized database to determine, based on the cryptographic hash and the updated status indicator, that the status of the document is the post-processing status;

based on determining that the status of the document is the post-processing status, denying the second resource request, wherein a user of the second user device initiates the second resource request via a user interface;

generating an alert comprising an indication of the denial of the second resource request and transmitting the alert to the second user device; and automatically preventing access for the second user device to the user interface.

6. The non-transitory computer-readable medium of claim 5, wherein the operations further comprise, subsequent to transmitting the resource request to the resource system to cause the resource system to perform the transfer of the resource from the first user account to the second user account:

detecting that the resource system has initiated the transfer of the resource from the first user account to the second user account; and in response to detecting that the resource system has initiated the transfer of the resource from the first user account to the second user account, updating the status indicator to change the status of the document from the pre-processing status to the processing status to generate a second updated status indicator; and storing the second updated status indicator in the centralized database in association with the hash function.

* * * * *